(12) United States Patent
Carnevali

(10) Patent No.: US 7,823,844 B2
(45) Date of Patent: Nov. 2, 2010

(54) QUICK RELEASE ELECTRONICS PLATFORM

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 693 days.

(21) Appl. No.: 11/809,283

(22) Filed: May 31, 2007

(65) Prior Publication Data

US 2008/0296821 A1    Dec. 4, 2008

(51) Int. Cl.
*F16M 11/00* (2006.01)

(52) U.S. Cl. ............ 248/176.1; 248/316.4; 248/346.04; 108/143; 361/807

(58) Field of Classification Search ............. 248/176.1, 248/309.1, 918, 346.07, 346.04, 316.4; 24/523; 361/807; 108/143; 174/520

See application file for complete search history.

(56) References Cited

U.S. PATENT DOCUMENTS

| | | | |
|---|---|---|---|
| 1,670,970 A | 5/1928 | Leverdiere |
| 1,684,925 A | 9/1928 | Perlmutter |
| 2,319,377 A | 5/1943 | Wallace et al. |
| 2,653,330 A | 9/1953 | Nolan |
| 2,733,492 A | 2/1956 | Copell |
| 3,509,882 A | 5/1970 | Blake |
| 3,581,424 A | 6/1971 | Bloom |
| 3,669,392 A | 6/1972 | Saunders |
| 4,066,231 A | 1/1978 | Bahner et al. |
| 4,118,003 A | 10/1978 | Dillow |
| 4,798,294 A | 1/1989 | Bodi |
| 4,802,708 A | 2/1989 | Vos et al. |
| 4,803,759 A | 2/1989 | Kemble |
| 4,844,387 A | 7/1989 | Sorgi et al. |
| 4,909,159 A | 3/1990 | Gonsoulin |
| 4,928,916 A | 5/1990 | Molloy |
| 4,957,264 A | 9/1990 | Hakanen |
| 4,976,721 A | 12/1990 | Blasnik et al. |
| 5,024,408 A | 6/1991 | Magee |
| 5,149,032 A | 9/1992 | Jones et al. |
| 5,457,745 A | 10/1995 | Wang |
| 5,582,377 A | 12/1996 | Quesada |
| D377,798 S | 2/1997 | Heine |
| 5,612,509 A | 3/1997 | Market |
| 5,653,414 A | 8/1997 | Chimel |
| 5,673,628 A | 10/1997 | Boos |
| D390,849 S | 2/1998 | Richter et al. |
| 5,788,202 A | 8/1998 | Richter |
| 5,793,614 A | 8/1998 | Tollbom |
| 5,845,885 A | 12/1998 | Carnevali |
| 5,903,645 A | 5/1999 | Tsay |
| 5,917,907 A | 6/1999 | Kela |
| 6,032,337 A | 3/2000 | Rankin et al. |
| 6,076,790 A | 6/2000 | Richter |
| 6,095,470 A | 8/2000 | Kalis |
| 6,173,933 B1 | 1/2001 | Whiteside et al. |

(Continued)

*Primary Examiner*—Anita M King
(74) *Attorney, Agent, or Firm*—Charles J. Rupnick, Attorney at Law

(57) ABSTRACT

A device mounting platform apparatus having a reconfigurable biasing mechanism. The device mounting platform apparatus includes a frame member capable of being mounted in a vehicle and having a device mounting surface facing generally upward. A clamp member is slidably interconnected to the frame member along a first direction. A biasing mechanism is coupled between the frame and clamp members. The biasing mechanism is reconfigurable for urging a jaw portion of the clamp member along the first direction heading either toward or away from the frame member. The biasing mechanism is thus reconfigurable for either urging the clamp member open or urging it closed.

20 Claims, 10 Drawing Sheets

U.S. PATENT DOCUMENTS

| | | |
|---|---|---|
| 6,213,438 B1 | 4/2001 | Ostby et al. |
| 6,229,893 B1 | 5/2001 | Chen |
| 6,260,866 B1 | 7/2001 | Cheng |
| 6,286,797 B1 | 9/2001 | Thaxton |
| 6,370,741 B1 | 4/2002 | Lu |
| 6,427,959 B1 | 8/2002 | Kalis et al. |
| 6,585,212 B2 | 7/2003 | Carnevali |
| 6,600,827 B2 | 7/2003 | Lu |
| 6,647,248 B1 | 11/2003 | Ortscheid et al. |
| 6,785,567 B2 | 8/2004 | Kato |
| 6,802,848 B2 | 10/2004 | Anderson et al. |
| 6,814,377 B2 | 11/2004 | Silverman et al. |
| 6,817,587 B2 | 11/2004 | Lin |
| 7,017,243 B2 | 3/2006 | Carnevali |
| 7,032,872 B2 | 4/2006 | Sullivan |
| 7,523,528 B2 * | 4/2009 | Carnevali .................... 24/523 |
| 7,551,458 B2 * | 6/2009 | Carnevali .................... 361/807 |
| 2004/0022388 A1 | 2/2004 | Chan et al. |
| 2006/0026807 A1 | 2/2006 | Carnevali |
| 2007/0022582 A1 | 2/2007 | Carnevali |
| 2007/0022583 A1 | 2/2007 | Carnevali |

* cited by examiner

QUICK RELEASE ELECTRONICS PLATFORM

FIELD OF THE INVENTION

The present invention relates generally to trays for holding portable devices, and in particular to quick release trays for holding portable electronic devices, including lap top computers and other similarly sized electronics devices.

BACKGROUND OF THE INVENTION

Many after-market accessories being added in automobiles and other vehicles require specially designed mounting platforms that can accommodate the limited available space normally found in a vehicle for mounting add-on equipment. These mounting platforms must be able to handle the load of the accessory device in the vibration and shock environment encountered in a moving vehicle while still permitting the portable device to be quickly and easily installed in the mounting platform. Some of the currently known mounting platforms are spring biased to open for quick retrieval of the device upon exiting the vehicle. Other known mounting platforms are biased to close quickly after the device is inserted.

However, known mounting platforms apparatus are limited in their ability to provide a full range of device mounting capabilities.

SUMMARY OF THE INVENTION

The present invention is a device mounting platform apparatus having a reconfigurable biasing mechanism. The novel device mounting platform apparatus includes a frame member capable of being mounted in a vehicle and having a device mounting surface facing generally upward. A clamp member is slidably interconnected to the frame member along a first direction. A biasing mechanism is coupled between the frame and clamp members. The biasing mechanism is reconfigurable for urging a jaw portion of the clamp member along the first direction heading either toward or away from the frame member. The biasing mechanism is thus reconfigurable for either urging the clamp member open or urging it closed.

According to one aspect of the novel device mounting platform apparatus, the device mounting platform apparatus includes a frame member formed with a device mounting surface thereon between spaced apart first and second edges. The frame member is further structured for being mounted in a vehicle with the device mounting surface having a generally upwardly orientation. A clamp member is slidably interconnected to the frame member for motion relative to the second edge of the frame member along a first direction that is oriented substantially crosswise of the spaced apart first and second edges thereof A novel reconfigurable biasing mechanism is coupled between the frame and clamp members. The novel biasing mechanism is reconfigurable between a first configuration for urging a jaw portion of the clamp member away from the second edge of the frame member along a first heading substantially aligned with the first direction, and a second configuration for urging a jaw portion of the clamp member toward the second edge of the frame member along a second heading substantially aligned with the first direction.

According to another aspect of the novel device mounting platform apparatus, the reconfigurable biasing mechanism includes a resiliently compressible biasing member coupled between the frame and clamp members. The biasing member is repositionable between different ones of first and second reaction portions fixed relative to either the frame or the clamp members in positions spaced apart substantially along the first direction, and an actuator portion positioned relative to the other one of the frame and clamp members in a position between the first and second fixed reaction portions. The biasing member is resiliently compressible between the actuator portion and the first fixed reaction portion in the first configuration, and is compressible between the actuator portion and the second fixed reaction portion in the second configuration.

According to another aspect of the novel device mounting platform apparatus, the actuator portion of the reconfigurable biasing mechanism further includes a repositionable actuator portion, the actuator portion being repositionable in the first and second configurations between respective different first and second actuator positions spaced apart substantially along the first direction between the first and second fixed reaction portions.

According to another aspect of the novel device mounting platform apparatus, the repositionable actuator portion of the reconfigurable biasing mechanism is further repositionable between first and second positions relative to the clamp member, and the first and second reaction portions are further fixed relative to the frame member.

According to another aspect of the novel device mounting platform apparatus, the repositionable actuator portion of the reconfigurable biasing mechanism is further repositionable between first and second positions relative to the frame member, and the first and second reaction portions are further fixed relative to the clamp member.

According to another aspect of the novel device mounting platform apparatus, the clamp member further includes a sled portion extended from the jaw portion thereof, the sled portion is slidably interconnected to the frame member for motion along the first direction for moving the jaw portion between first and second positions relative to the second edge of the frame member, the first position being spaced away from the second edge of the frame member, and the second position being adjacent thereto.

According to another aspect of the novel device mounting platform apparatus, the frame member further includes a track formed substantially along the first direction between first and second edges of the mounting surface, and the sled portion of the clamp member is structured to slide relative to the track.

According to another aspect of the novel device mounting platform apparatus, the sled portion of the clamp member further includes the first and second fixed reaction portions and an elongated containment channel formed therebetween, and the biasing member is further resiliently compressible within the containment channel.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 12 and 13 are bottom perspective cross-section views that illustrate by example and without limitation the novel mounting platform apparatus having the novel reconfigurable biasing mechanism configured in the retraction mode, wherein:

FIG. 12 the illustrates the clamp member being forcefully expanded relative to the frame member by an externally applied expansion force, and FIG. 13 illustrates the clamp member being forcefully retracted relative to the frame member by internal expansive biasing forces generated by expansion of one or more biasing members;

FIGS. 14-17 are different cross-section views illustrate by example and without limitation a first alternative embodiment of the novel reconfigurable biasing mechanism, wherein:

FIG. 14 illustrates the alternative novel reconfigurable biasing mechanism configured in an expansion mode for urging a jaw portion of the clamp member away from the frame member and having the jaw portion spaced away from the frame member, FIG. 15 illustrates the alternative novel reconfigurable biasing mechanism configured in the expansion mode for urging a jaw portion of the clamp member away from the frame member and having the jaw portion retracted relative to the frame member and interlocked therewith, FIG. 16 illustrates the alternative novel reconfigurable biasing mechanism configured in a retraction mode for urging a jaw portion of the clamp member toward the frame member and having the jaw portion retracted relative to the frame member and interlocked therewith, and FIG. 17 illustrates the alternative novel reconfigurable biasing mechanism configured in the retraction mode for urging a jaw portion of the clamp member toward the frame member and having the jaw portion expanded away from the frame member; and FIGS. 18-21 are different cross-section views illustrate by example and without limitation a first alternative embodiment of the novel reconfigurable biasing mechanism, wherein:

FIG. 18 illustrates the alternative novel reconfigurable biasing mechanism configured in an expansion mode for urging a jaw portion of the clamp member away from the frame member and having the jaw portion spaced away from the frame member, FIG. 19 illustrates the alternative novel reconfigurable biasing mechanism configured in the expansion mode for urging a jaw portion of the clamp member away from the frame member and having the jaw portion retracted relative to the frame member and interlocked therewith, FIG. 20 illustrates the alternative novel reconfigurable biasing mechanism configured in a retraction mode for urging a jaw portion of the clamp member toward the frame member and having the jaw portion retracted relative to the frame member and interlocked therewith, and FIG. 21 illustrates the alternative novel reconfigurable biasing mechanism configured in the retraction mode for urging a jaw portion of the clamp member toward the frame member and having the jaw portion expanded away from the frame member;

DETAILED DESCRIPTION OF PREFERRED EMBODIMENT

In the Figures, like numerals indicate like elements.

Figure 1:
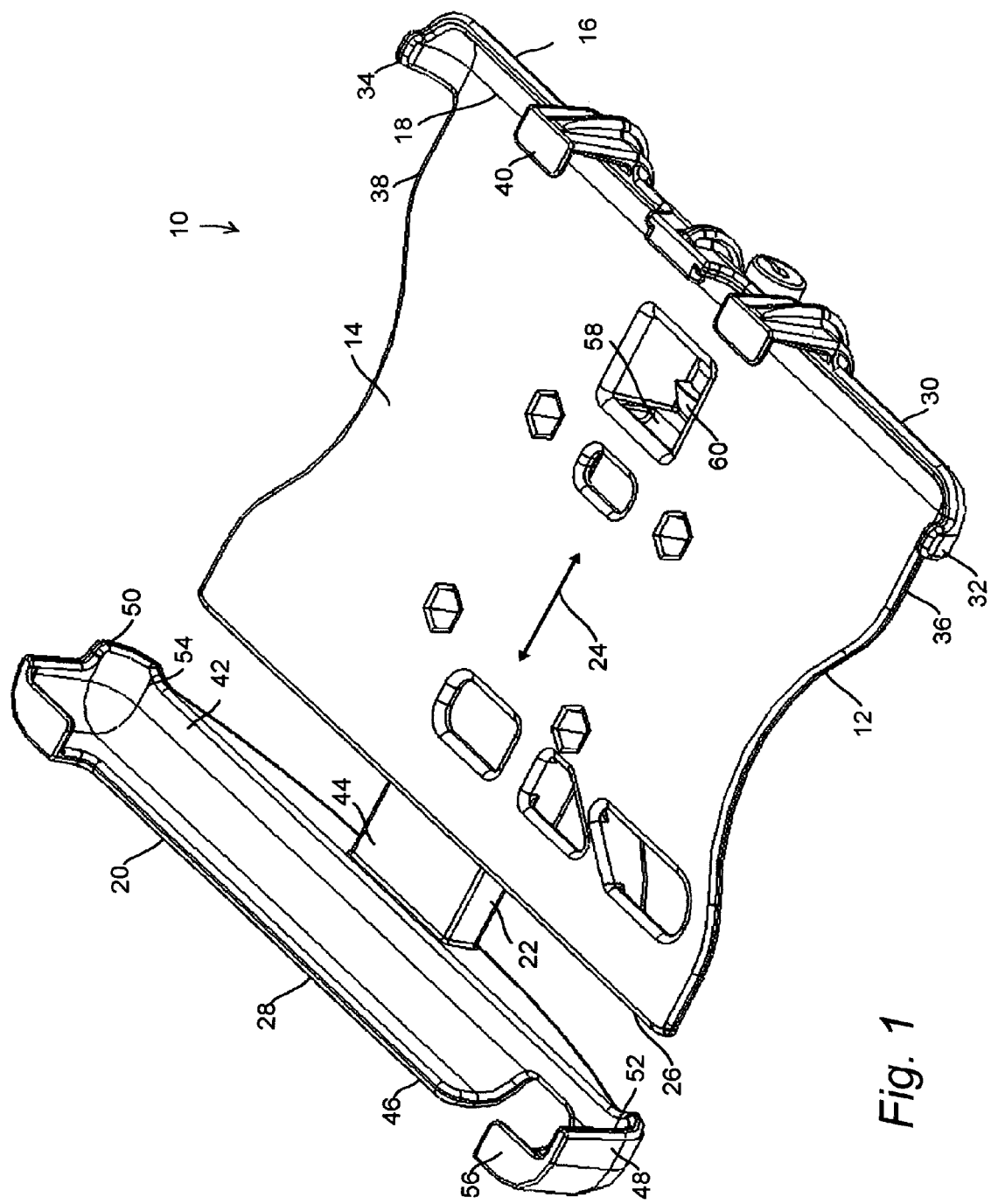
FIG. 1 is a top perspective view showing one example of the novel device mounting platform apparatus having a clamp member configured in an expanded relationship relative to a stationary frame member.

FIG. 1 illustrates the invention by example and without limitation as a novel device mounting platform apparatus 10 having a frame member 12 capable of being mounted in a vehicle and having a substantially planar device mounting surface 14 facing generally upward and a jaw portion 16 formed adjacent to one edge 18. A clamp member 20 is formed with a sled portion 22 slidably interconnected to the frame member 12 generally along a first direction (indicated by arrow 24) or a path substantially parallel therewith for extending (shown here) and retracting (shown in FIG. 2) the clamp member 20 relative to a second edge 26 of the device mounting surface 14 opposite from the first edge 18. In an expanded relationship (shown here) of the clamp member 20 relative to the frame member 12, a jaw portion 28 of the clamp member 20 is spaced along the first direction 24 away from the second edge 26 of the device mounting surface 14. In a retracted relationship (shown in FIG. 2) of the clamp member 20 relative to the frame member 12, the jaw portion 28 of the clamp member 20 is retracted along the first direction 24 into a position adjacent to the second edge 26 of the device mounting surface 14.

As illustrated here by example and without limitation, jaw portion 16 of the frame member 12 is formed with a substantially upright fence portion 30 extended along the first edge 18 and opposite end portions 32 and 34 wrapped around to opposite side edges 36 and 38 of the device mounting surface 14. The jaw portion 16 of the frame member 12 is also illustrated here by example and without limitation as being formed with a split lip portion 40 extended above the fence portion 30 and substantially overhanging the device mounting surface 14.

The jaw portion 28 of the clamp member 20 is illustrated here by example and without limitation as having a lower lip portion 42 extended crosswise of the sled portion 22 adjacent to a first extendable end 44 thereof. The jaw portion 28 of the clamp member 20 is formed with substantially upright split fence portion 46 extended along the lower lip portion 42 and opposite end portions 48 and 50 wrapped around to opposite side edges 52 and 54 thereof. The jaw portion 28 of the clamp member 20 is also illustrated here by example and without limitation as being formed with a split lip portion 56 extended above the fence portion 46 and substantially overhanging both the lower lip portion 42 and the device mounting surface 14 of the frame member 12.

A portable electronics device is mounted in the novel device mounting platform apparatus 10 while the clamp member 20 is extended (shown here) by fitting between the opposing wraparound end portions 32 and 34 of the fence portion 30, and slipping a front or rear face against the frame's jaw portion 16 under the overhanging lip portion 40, and settling a bottom surface of the device against the generally upward facing device mounting surface 14. The clamp member 20 is then retracted (illustrated in FIG. 2) to move the jaw portion 28 against the opposite front or rear face of the portable device with its lower lip portion 42 under a bottom edge of the device, its fence portion 46 against the opposite front or rear face of the portable device with the wraparound end portions 48 and 50 capturing opposite corners of the device, and its lip portion 56 overhanging the portable device. The portable device is thus effectively secured in the confines of the novel device mounting platform apparatus 10 in a manner which exposes its top surface to the user.

Figure 2:
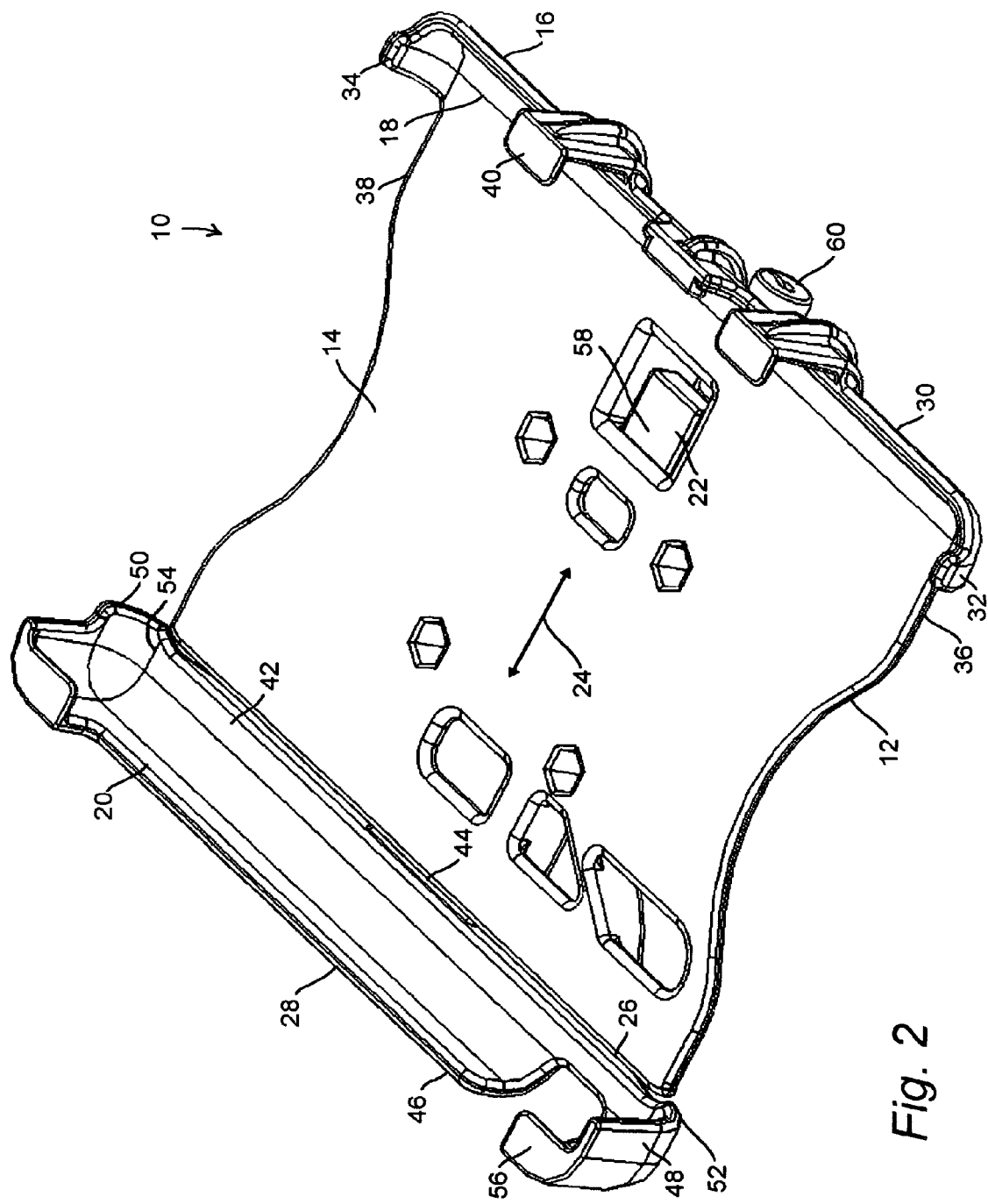
FIG. 2 is another top perspective view that illustrates the novel device mounting platform apparatus by example and without limitation as a having the clamp member configured in a retracted relationship relative to the frame member.

FIG. 2 illustrates the novel device mounting platform apparatus 10 by example and without limitation as a having the clamp member 20 configured in a retracted relationship relative to the frame member 12. Here, the jaw portion 28 of the clamp member 20 is retracted along the first direction 24 into a position adjacent to the second edge 26 of the device mounting surface 14. The frame and clamp members 12, 20 are illustrated here as being interlockable with the clamp member 20 being retracted relative to the frame member 12. By example and without limitation, a second latching end 58 of the sled portion 22 opposite from the extendable end 44 thereof is illustrated as interconnected with a catch 60 coupled to the frame member 12. The catch 60 is, for example, either a latch or lock such as a keyed lock (shown). The clamp member 20 is thus securely retained in the retracted relationship with the frame member 12 for confining the portable device.

Figure 3:
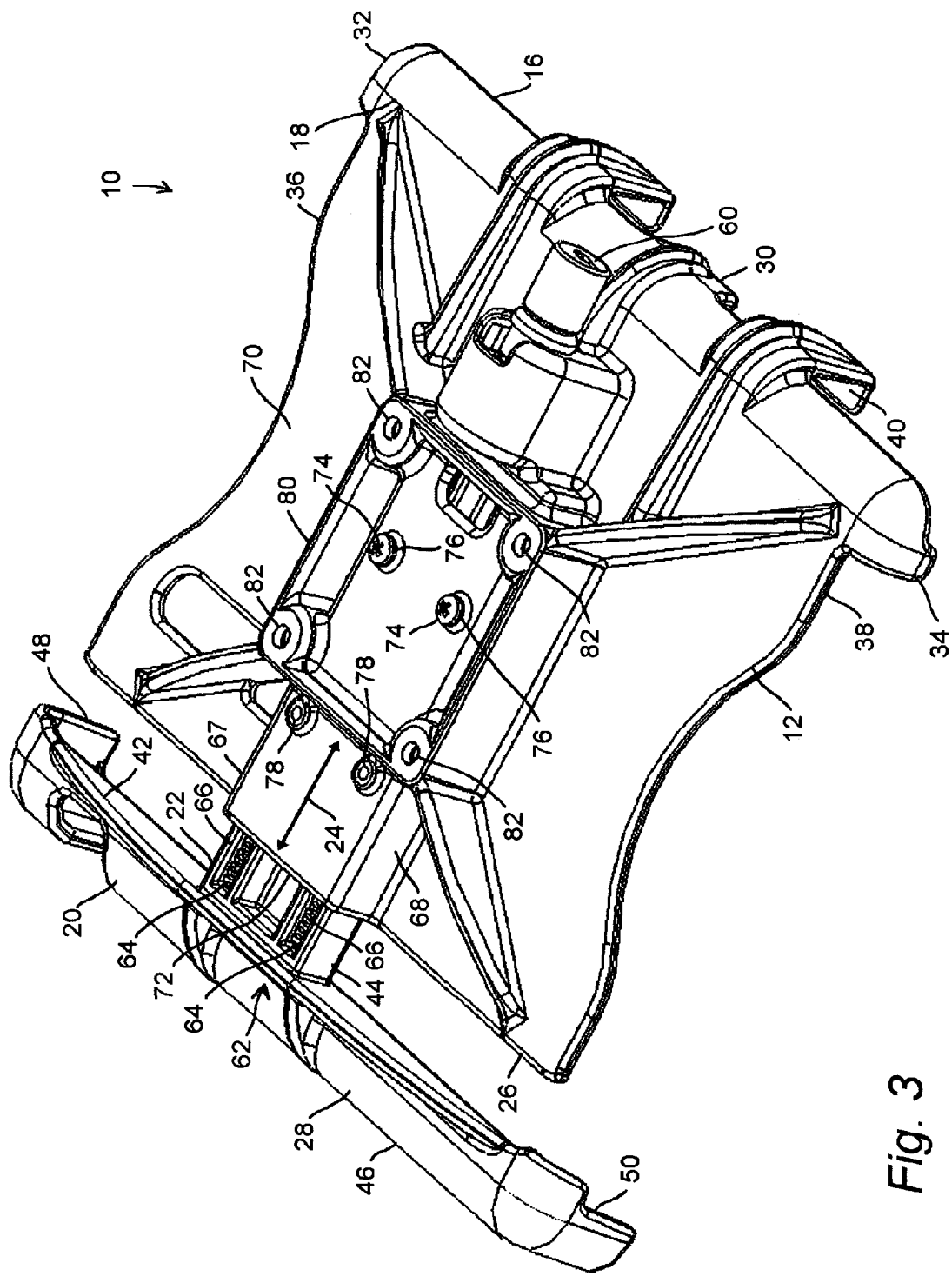
FIG. 3 is a bottom perspective view that illustrates the novel device mounting platform apparatus by example and without limitation as a having the clamp member configured in the extended relationship relative to the frame member.

FIG. 3 illustrates the novel device mounting platform apparatus 10 by example and without limitation as a having the clamp member 20 configured in the extended relationship relative to the frame member 12. Here, the jaw portion 28 of the clamp member 20 is spaced along the first direction 24 away from the second edge 26 of the device mounting surface 14.

The novel device mounting platform apparatus 10 includes a reconfigurable biasing mechanism 62 coupled between the frame member 12 and clamp member 20 for urging the clamp member 20 along the first direction 24 heading toward either the extended relationship (shown) or the retracted relationship (shown in FIG. 1) with the frame member 12. By example and without limitation, the reconfigurable biasing mechanism 62 includes one or more biasing members 64 coupled between the frame member 12 and clamp member 20 for urging the jaw portion 28 of the clamp member 20 onto a heading either toward or away from the second edge 26 of the frame member's device mounting surface 14. Here, by example and without limitation, one of the biasing members 64 is seated in each of one or more recesses or biasing member containment channels 66 formed in the sled portion 22 of the clamp member 20. A guide mechanism 67 is structured on the frame member 12 opposite from the device mounting surface 14 for guiding the sled portion 22 substantially along the first direction 24. For example, the sled portion 22 is slidingly inserted into a track 68 formed, for example as a channel, in a floor portion 70 of the frame member 12 below the device mounting surface 14 through a mouth opening 72 positioned adjacent to the second edge 26. One or more movable actuator portions 74 are coupled to the frame's floor portion 70 and cooperate with the containment channels 66 for compressing the respective biasing members 64. The actuator portions 74 are, by example and without limitation, pins or screws movable between clamp expansion positions 76 and clamp retraction positions 78 in the floor portion 70 of the frame member 12 relative to the sled portion 22 of the clamp member 20. In the clamp expansion positions 76 (shown), the actuator portions 74 are spaced away from the second edge 26 of the device mounting surface 14 toward its opposite first edge 18. The clamp retraction positions 78 position the actuator portions 74 spaced away from the first edge 18 of the device mounting surface 14 nearer to its opposite second edge 26. The actuator portions 74 thus split the biasing member containment channels 66 into expansion and retraction channel portions 66a and 66b, which are more clearly illustrated in FIG. 6 and FIG. 10, respectively.

Structure 80 is illustrated here as several mounting holes 82 for mounting the frame member 12 in a vehicle.

Figure 4:
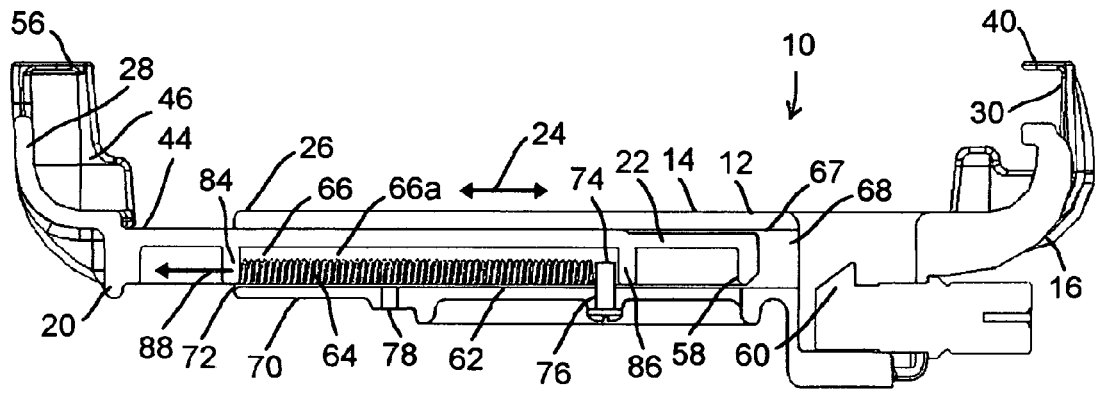
FIG. 4 is a cross-section view that illustrates by example and without limitation the novel device mounting platform apparatus as having a novel reconfigurable biasing mechanism configured in an expansion mode for urging a jaw portion of the clamp member away from the frame member, which is illustrated here with the jaw portion expanded away from the frame member.

FIG. 4 is a cross-section view that illustrates by example and without limitation the novel device mounting platform apparatus 10 as having the reconfigurable biasing mechanism 62 configured in an expansion mode. Accordingly, the actuator portions 74 are positioned in the clamp expansion positions 76 spaced away from the second edge 26 of the device mounting surface 14. The device mounting platform apparatus 10 is illustrated here as having the clamp member 20 in the expanded relationship with the frame member 12. As illustrated here, the one or more containment recesses or channels 66 formed in the sled portion 22 are optionally truncated adjacent to opposite ends by spaced apart internal reaction portions 84 and 86 for expansion and retraction, respectively, of the clamp member 20. The biasing members 64, illustrated here by example and without limitation as conventional compression springs, are captured in one of the expansion and retraction portions 66a and 66b of the channel 66 between the actuator portions 74 and one of the internal reaction portions 84 and 86 for expansion and retraction, respectively. When the reconfigurable biasing mechanism 62 is configured in the expansion mode, as illustrated here, the biasing members 64 are captured in the expansion portions 66a of the channel 66 between the actuator portions 74 and the expansive internal reaction portions 84 adjacent to the jaw portion 28 of the clamp member 20. Accordingly, the biasing members 64 and actuator portions 74 are positioned relative to the containment channels 66 for urging the sled portion 22 of the clamp member 20 to slide along the first direction 24 within the track channel 68 heading out the mouth opening 72. When the catch 60 is released from the second latching end 58 of the sled portion 22, as illustrated here, expansion of the one or more biasing members 64 generates an internal expansive biasing force 88 between the actuator portions 74 and the internal expansive reaction portions 84 that urges the sled portion 22 of the clamp member 20 on a heading along the track channel 68 for spacing the jaw portion 28 outward away from the second edge 26 of the device mounting surface 14. The distance between the spaced apart internal reaction portions 84 and 86 is a function of the desired size and strength of the spring biasing members 64, as well as the desired spacing between the jaw portion 28 from the second edge 26 of the device mounting surface 14 in the expanded relationship of the clamp member 20 and frame member 12. The internal expansive biasing force 88 thus urges the clamp member 20 to obtain or remain in its expanded relationship relative to the frame member 12. The mounting platform apparatus 10 is thus open to receive or retrieve the portable device.

The second retractive internal reaction portions 86 are optionally positioned relative to the actuator portions 74, as illustrated here, to mutually interfere along the first direction 24 to limit expansion of the clamp member 20 relative to the frame member 12. The clamp member 20 is thus restrained from expanding more than needed for inserting the portable electronic device into the mounting platform apparatus 10. Other mechanisms for restraining excess expansion of the clamp member 20 relative to the frame member 12 are also contemplated and may be substituted without departing from scope and intent of the present invention.

Figure 5:
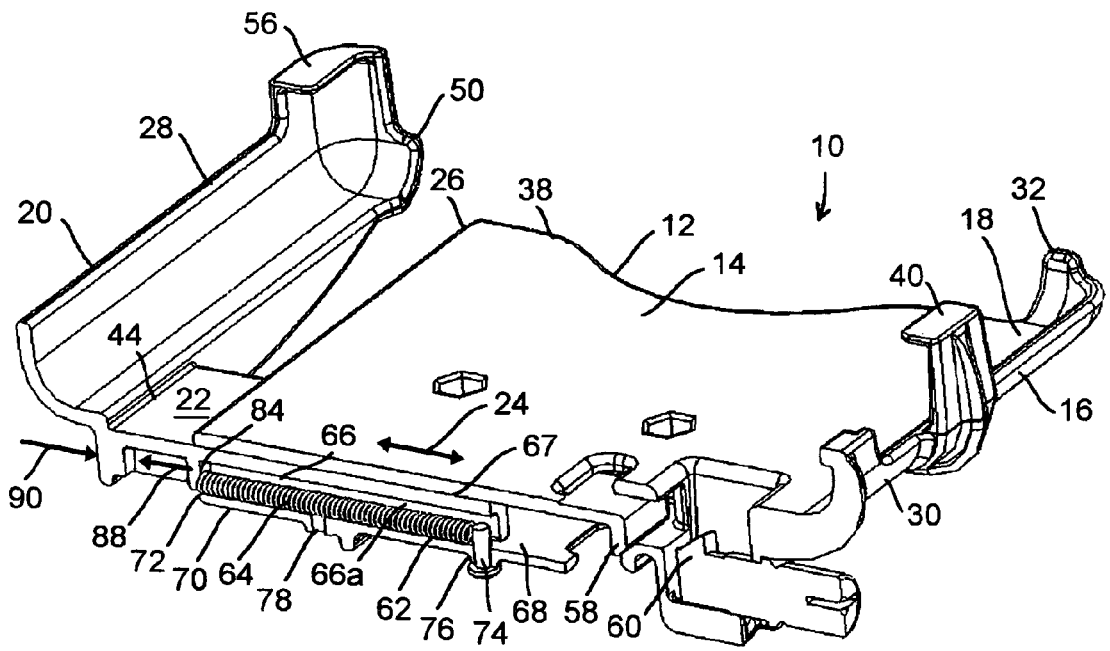
FIG. 5 is a perspective cross-section view that illustrates by example and without limitation the novel device mounting platform apparatus having the novel reconfigurable biasing mechanism configured in the expansion mode, which is illustrated here with the jaw portion expanded relative to the frame member, as illustrated in FIG. 4.

FIG. 5 is a perspective cross-section view that illustrates by example and without limitation the novel device mounting platform apparatus 10 as having the reconfigurable biasing mechanism 62 configured in an expansion mode. The retractive internal reaction portions 86 are omitted for clarity.

The clamp member 20 is forcefully expanded relative to the frame member 12 by expansion of the biasing members 64 within the expansion portions 66a of the channel 66 between the actuator portions 74 and the expansive internal reaction portions 84. The one or more biasing members 64 thus generate the internal biasing force 88 that urges the sled portion 22 of the clamp member 20 into its expanded relationship relative to the frame member 12, whereby the jaw portion 28 of the clamp member 20 is expanded along the first direction 24 into a position spaced away from the second edge 26 of the device mounting surface 14. The mounting platform apparatus 10 is thus open to receive or retrieve the portable device.

Figure 6:
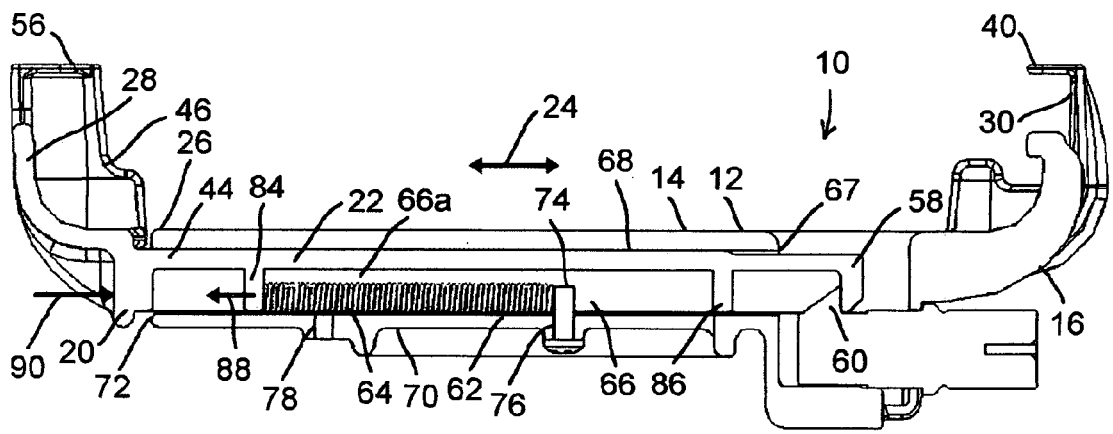
FIG. 6 is a cross-section view that illustrates by example and without limitation the novel device mounting platform apparatus as having a novel reconfigurable biasing mechanism configured in an expansion mode for urging a jaw portion of the clamp member away from the frame member, which is illustrated here with the jaw portion illustrated as being retracted relative to the frame member and interlocked therewith.

FIG. 6 is a cross-section view that illustrates the reconfigurable biasing mechanism 62 configured in an expansion mode. The device mounting platform apparatus 10 is illustrated here as having the clamp member 20 in the retracted relationship with the frame member 12. Here, an opposing external compressive force 90 greater than the internal expansive biasing force 88 must be applied for retracting the clamp member 20 relative to the frame member 12. The greater opposing external compression force 90 must overcome the internal expansion biasing force 88 to forcefully compress the biasing members 64 within the expansion portions 66a of the containment channels 66 between the actuator portions 74 and the expansive internal reaction portions 84. The sled portion 22 of the clamp member 20 is forced against the internal expansion force 88 of the biasing members 64 to move along the first direction 24 heading inwardly through the mouth opening 72 and slide relative to the floor portion 70 of the frame member 12 within the track channel 68. The sled portion 22 of the clamp member 20 is moved far enough along the track channel 68 for its latching end 58 to approach the first edge 18 of the device mounting surface 14 where it is engaged by the catch 60. The biasing members 64 are compressed in the expansion portions 66a of the containment channels 66 between the actuator portions 74 and the expansive internal reaction portions 84 and restrained against immediate expansion by engagement of the catch 60 with the latching end 58 of the sled portion 22. Accordingly, release of the catch 60 permits the compressed biasing members 64 to forcefully expand against the expansive internal reaction portions 84 of the expansion portions 66a of the channels 66. Expansion of the biasing members 64 forcefully drives the sled portion 22 of the clamp member 20 to slide along the track channel 68 in the floor portion 70 of the frame member 12 until the retractive internal reaction portions 86 encounter the actuator portions 74. The internal expansive biasing force 88 thus urges the clamp member 20 to obtain its expanded relationship relative to the frame member 12, as illustrated in FIG. 4, whereby the jaw portion 28 is spaced away from the second edge 26 of the device mounting surface 14 sufficiently to receive or retrieve the portable device.

Figure 7:
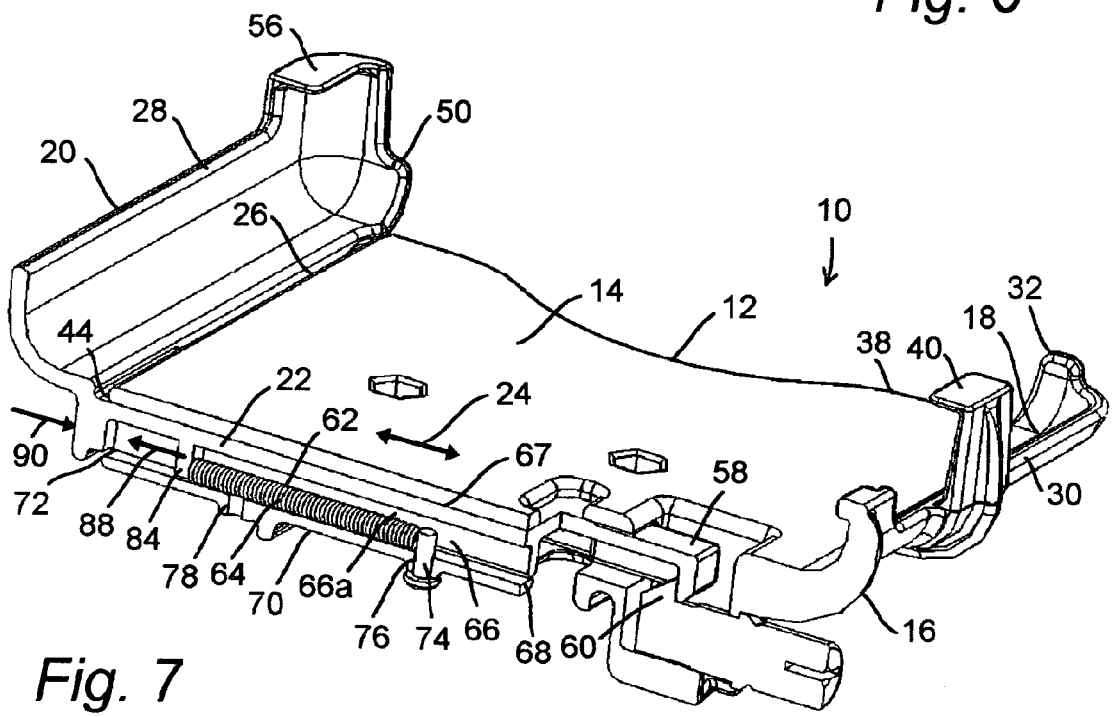
FIG. 7 is a perspective cross-section view that illustrates by example and without limitation the novel device mounting platform apparatus having the novel reconfigurable biasing mechanism configured in an expansion mode, which is illustrated here with the jaw portion retracted relative to the frame member and interlocked therewith, as illustrated in FIG. 6.

FIG. 7 is a perspective cross-section view that illustrates the reconfigurable biasing mechanism 62 configured in an expansion mode with the clamp member 20 forcefully retracted relative to the frame member 12 by compression of the biasing members 64 within the expansion portions 66a of the containment channels 66 between the actuator portions 74 and the expansive internal reaction portions 84. The retractive internal reaction portions 86 are omitted for clarity.

The external compression force 90 applied to the clamp member 20 overcomes the internal biasing force 88. The biasing members 64 are forcefully compressed within the expansion portions 66a of the containment channels 66 between the actuator portions 74 and the expansive internal reaction portions 84. The clamp member 20 is thus forcefully retracted relative to the frame member 12. The one or more biasing members 64 are thus compressed for generating the internal biasing force 88 that urges the sled portion 22 of the clamp member 20 into its expanded relationship relative to the frame member 12, whereby the jaw portion 28 of the clamp member 20 is expanded along the first direction 24 into a position spaced away from the second edge 26 of the device mounting surface 14. The mounting platform apparatus 10 is thus open to receive or retrieve the portable device, as illustrated in FIG. 5.

Figure 8:
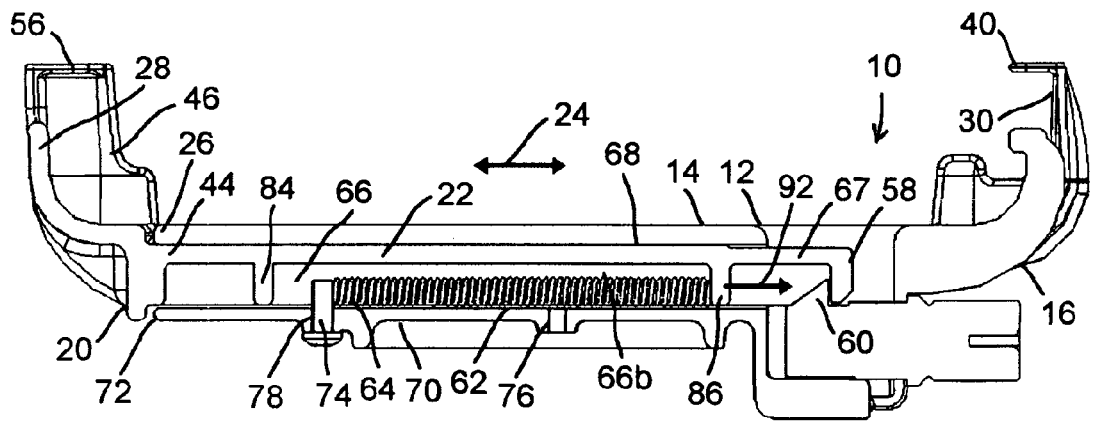
FIG. 8 is a cross-section view that illustrates by example and without limitation the device mounting platform apparatus as having the novel reconfigurable biasing mechanism configured in a retraction mode for urging a jaw portion of the clamp member toward the frame member, which is illustrated here with the jaw portion of the clamp member retracted relative to the frame member and interlocked therewith.

FIG. 8 is a cross-section view that illustrates the device mounting platform apparatus 10 as having the clamp member 20 in the retracted relationship with the frame member 12. The novel device mounting platform apparatus 10 is illustrated here by example and without limitation as having the reconfigurable biasing mechanism 62 reconfigured in a retraction mode. Accordingly, the one or more movable actuator portions 74 are repositioned from the clamp expansion positions 76 (shown in FIG. 3) to the clamp retraction positions 78 in the floor portion 70 of the frame member 12 adjacent to the second edge 26 of the device mounting surface 14. The biasing members 64 are repositioned within the containment channels 66 from the expansion portions 66a between the actuator portions 74 and the expansive internal reaction portions 84 to the retraction portions 66*b* between the actuator portions 74 and the retractive internal reaction portions 86 adjacent to the second latching end 58 of the sled portion 22. Accordingly, the biasing members 64 and actuator portions 74 are positioned relative to the containment channels 66 for generating an internal retraction biasing force 92 that urges the sled portion 22 of the clamp member 20 to slide along the first direction 24 within the track channel 68 heading into the mouth opening 72, rather than on a heading out of the mouth opening 72 as caused by the internal biasing force 88 generated in the expansion mode of the reconfigurable biasing mechanism 62. The internal biasing force 92 thus urges the clamp member 20 to retain its retracted relationship relative to the frame member 12.

When the reconfigurable biasing mechanism 62 is configured in the retraction mode, as illustrated here by example and without limitation, engagement of the catch 60 with the second latching end 58 of the sled portion 22 is a security mechanism for ensuring the installed portable electronics device remains securely mounted in the mounting platform apparatus 10. Furthermore, when the catch 60 is a lock as shown, the installed portable electronics device remains secure against unauthorized removal. Thus, disengagement of the catch 60 from the second latching end 58 of the sled portion 22 only permits manual retraction of the clamp member 20 relative to the frame member 12.

Figure 9:
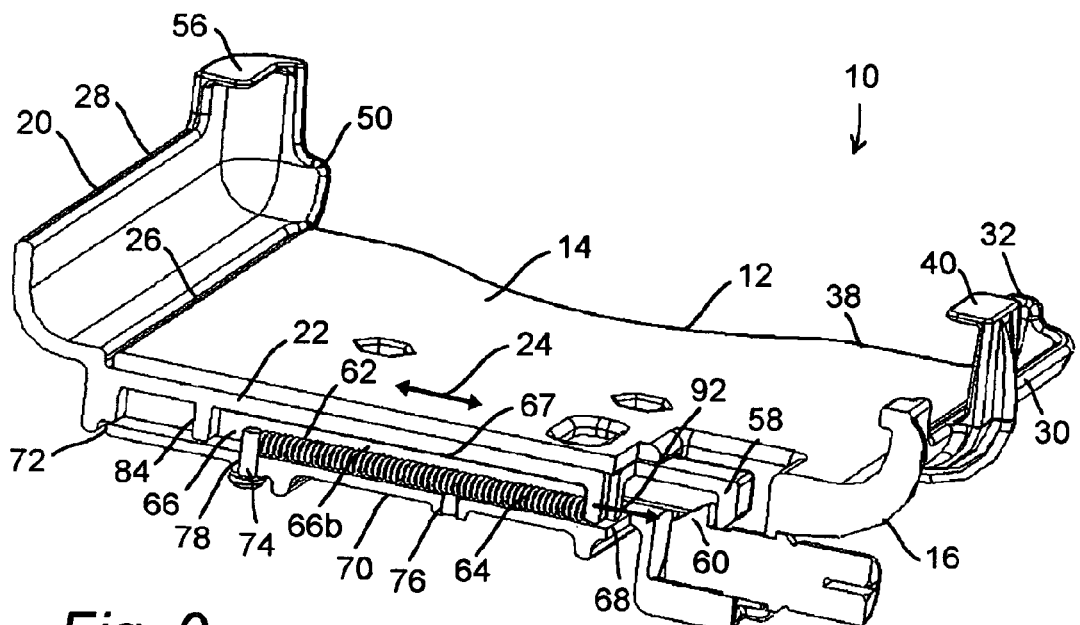
FIG. 9 is a perspective cross-section view that illustrates by example and without limitation the novel device mounting platform apparatus having the novel reconfigurable biasing mechanism configured in the retraction mode, which is illustrated here with the jaw portion retracted relative to the frame member and interlocked therewith, as illustrated in FIG. 8.

FIG. 9 is a perspective cross-section view that illustrates the reconfigurable biasing mechanism 62 configured in a retraction mode having the clamp member 20 forcefully retracted relative to the frame member 12 by expansion of the biasing members 64 within the retraction portions 66*b* of the containment channels 66 between the actuator portions 74 and the retractive internal reaction portions 86. The one or more biasing members 64 thus generate the internal biasing force 92 that urges the sled portion 22 of the clamp member 20 to remain in its retracted relationship relative to the frame member 12, whereby the jaw portion 28 of the clamp member 20 is retracted along the first direction 24 into a position adjacent to the second edge 26 of the device mounting surface 14.

Figure 10:
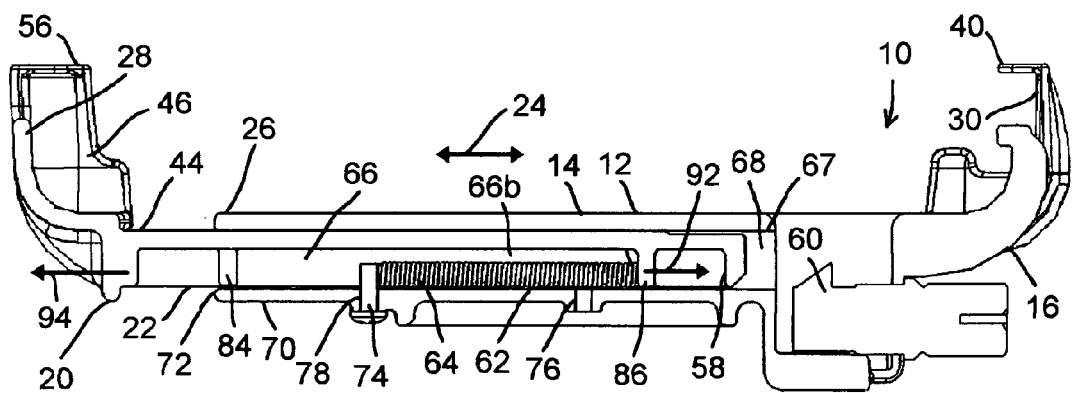
FIG. 10 is a cross-section view that illustrates by example and without limitation the novel device mounting platform apparatus as having a novel reconfigurable biasing mechanism configured in the retraction mode for urging a jaw portion of the clamp member toward the frame member, which is illustrated here with the jaw portion expanded away from the frame member.

FIG. 10 is a cross-section view that illustrates the device mounting platform apparatus 10 as having the clamp member 20 in the expanded relationship with the frame member 12. The novel device mounting platform apparatus 10 is illustrated here by example and without limitation as having the reconfigurable biasing mechanism 62 configured in a retraction mode. Accordingly, the one or more movable actuator portions 74 are positioned the clamp retraction positions 78 in the floor portion 70 of the frame member 12 adjacent to the second edge 26 of the device mounting surface 14. The biasing members 64 are positioned within the retraction portions 66*b* of the containment channels 66 between the actuator portions 74 and the retractive internal reaction portions 86 adjacent to the second latching end 58 of the sled portion 22. The biasing members 64 are thus positioned relative to the containment channels 66 for generating the internal biasing force 92 that urges the sled portion 22 of the clamp member 20 to slide along the first direction 24 within the track channel 68 into the mouth opening 72. The internal biasing force 92 thus urges the clamp member 20 to obtain or remain in its retracted relationship relative to the frame member 12, as illustrated in FIG. 8.

When the catch 60 is released from the second latching end 58 of the sled portion 22, as illustrated here, an opposing external expansive force 94 greater than the internal retractive biasing force 92 must be applied for expanding the clamp member 20 relative to the frame member 12. The greater opposing external expansion force 94 must overcome the internal retractive biasing force 92 to forcefully compress the biasing members 64 within the retraction portions 66*b* of the containment channels 66 between the actuator portions 74 and the retractive internal reaction portions 86. The sled portion 22 of the clamp member 20 is forced against the internal expansion force 92 of the biasing members 64 to head along the first direction 24 outwardly through the mouth opening 72 and slide relative to the floor portion 70 of the frame member 12 within the track channel 68. The sled portion 22 of the clamp member 20 is moved far enough along the track channel 68 to receive or retrieve the portable device. The biasing members 64 are compressed in the retraction portions 66*b* of the containment channels 66 between the actuator portions 74 and the retractive internal reaction portions 86. A limiting mechanism is optionally provided for limiting travel of the clamp member 20. Alternatively, mere compression of the biasing members 64 can be relied upon for limiting travel of the clamp member 20. The mounting platform apparatus 10 is thus open to receive or retrieve the portable device.

A trigger mechanism is optionally provided for restraining the compressed biasing members 64 against immediate expansion. Accordingly, removal of the external expansion force 94 permits the compressed biasing members 64 to forcefully expand against the retractive internal reaction portions 86 within the retraction portions 66*b* of the channels 66. Expansion of the biasing members 64 forcefully drives the sled portion 22 of the clamp member 20 to slide inwardly along the track channel 68 in the floor portion 70 of the frame member 12 until the second latching end 58 of the sled portion 22 encounters the catch 60 and is engaged therewith.

Figure 11:
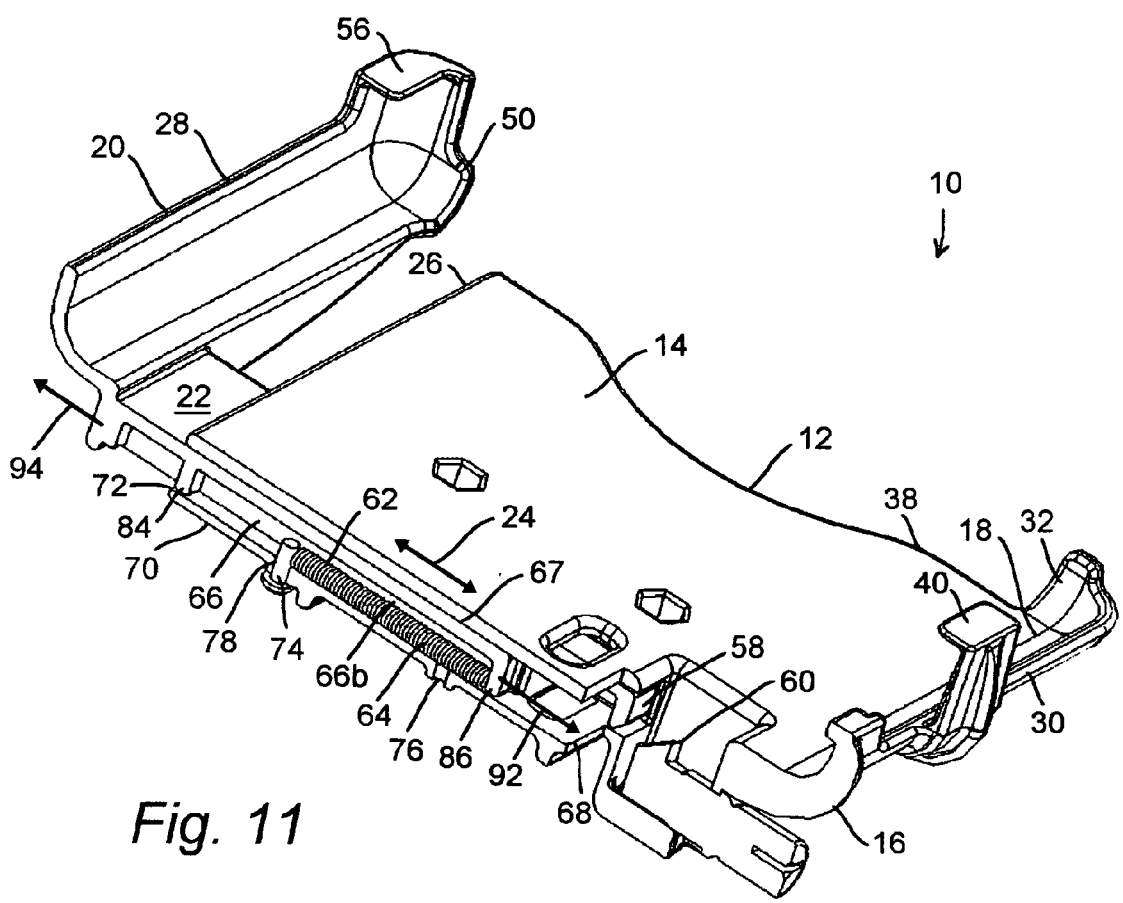
FIG. 11 is a perspective cross-section view that illustrates by example and without limitation the novel device mounting platform apparatus having the novel reconfigurable biasing mechanism configured in the retraction mode, which is illustrated here with the jaw portion expanded relative to the frame member, as illustrated in FIG. 10.

FIG. 11 is a perspective cross-section view that illustrates the reconfigurable biasing mechanism 62 configured in a retraction mode having the clamp member 20 forcefully expanded relative to the frame member 12 by application of the external expansion force 94 for overcoming the internal biasing force 92. The biasing members 64 are thus manually compressed within the retraction portions 66*b* of the containment channels 66 between the actuator portions 74 and the retractive internal reaction portions 86 by the external expansion force 94. Compression between the actuator portions 74 and the retractive internal reaction portions 86 causes the one or more biasing members 64 to generate the internal biasing force 92 that urges the sled portion 22 of the clamp member 20 to retract into the track channel 68 formed in a floor portion 70 of the frame member 12 where its second latching end 58 is engaged with the catch 60. In this retraction mode of the reconfigurable biasing mechanism 62, only the externally applied expansion force 94 retains the clamp member 20 in its retracted relationship relative to the frame member 12, whereby the jaw portion 28 of the clamp member 20 is expanded along the first direction 24 into a position spaced away from the second edge 26 of the device mounting surface 14 for receiving or retrieving the portable device. Accordingly, when the external expansion force 94 is removed, the one or more biasing members 64 generate the internal biasing force 92 that urges the sled portion 22 to retract into the track channel 68, whereby the clamp member 20 is substantially automatically retracted relative to the frame member 12. The mounting platform apparatus 10 thus securely retains the portable device in a manner which exposes its top surface to the user.

Figure 12:
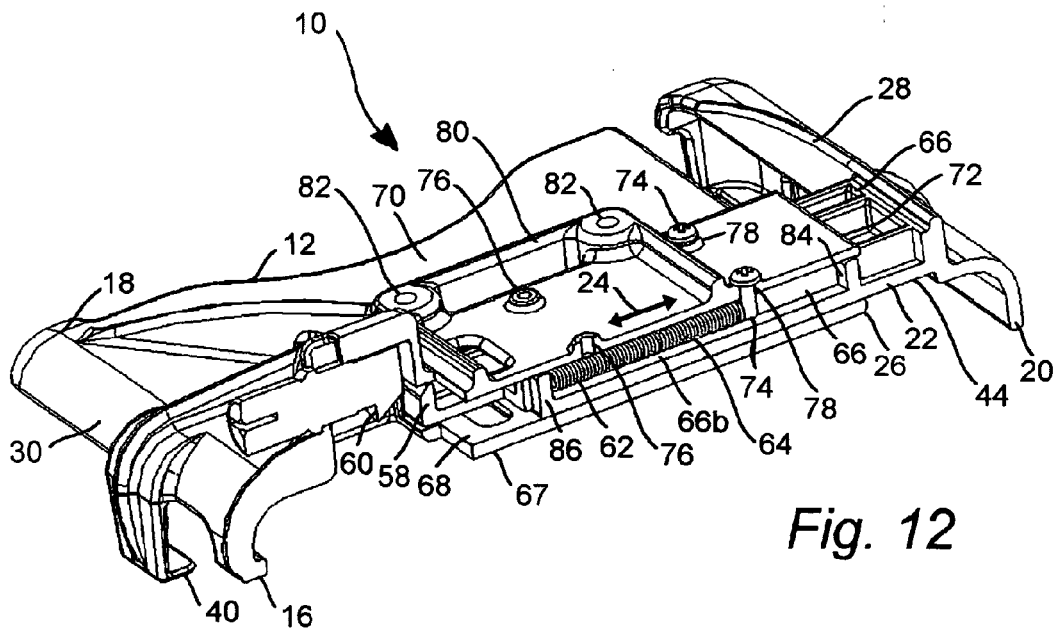
Figure 13:
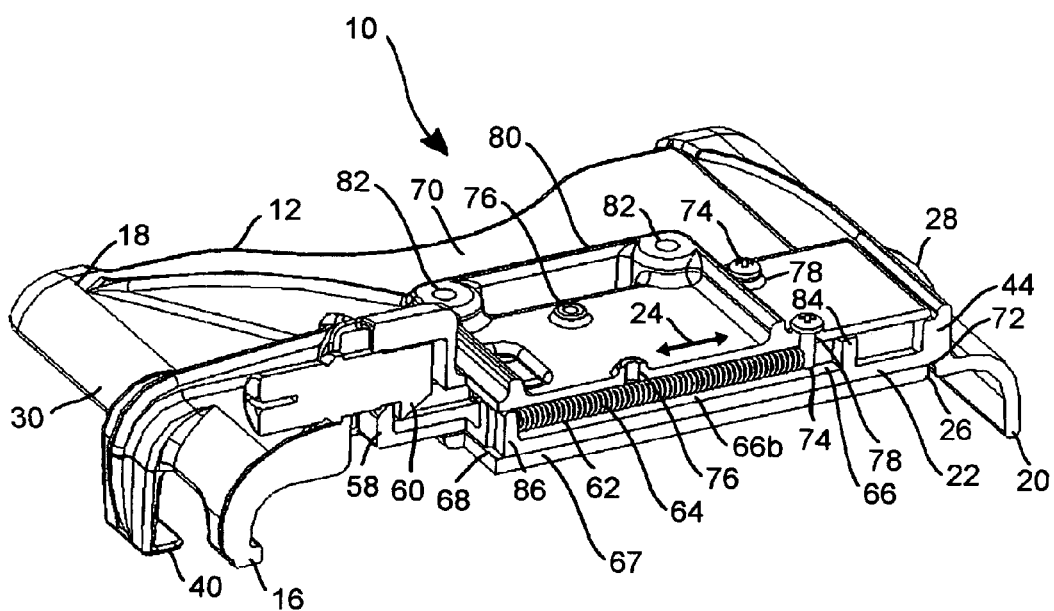

FIGS. 12 and 13 are bottom perspective cross-section views that illustrate the novel mounting platform apparatus 10 having the reconfigurable biasing mechanism 62 configured in a retraction mode. FIG. 12 illustrates the clamp member 20 being forcefully expanded relative to the frame member 12 by the externally applied expansion force 94 overcoming the internal expansive biasing force 92 and compressing the one or more biasing members 64 between the actuator portions 74 and the retractive internal reaction portions 86. The clamp member 20 is thus in its retracted relationship with the frame member 12. FIG. 13 illustrates the clamp member 20 being forcefully retracted into its retracted relationship with the frame member 12 by the internal expansive biasing force 92 generated by expansion of the one or more biasing members 64 between the actuator portions 74 and the retractive internal reaction portions 86. The clamp member 20 is thus in its expanded relationship with the frame member 12.

Figure 14:
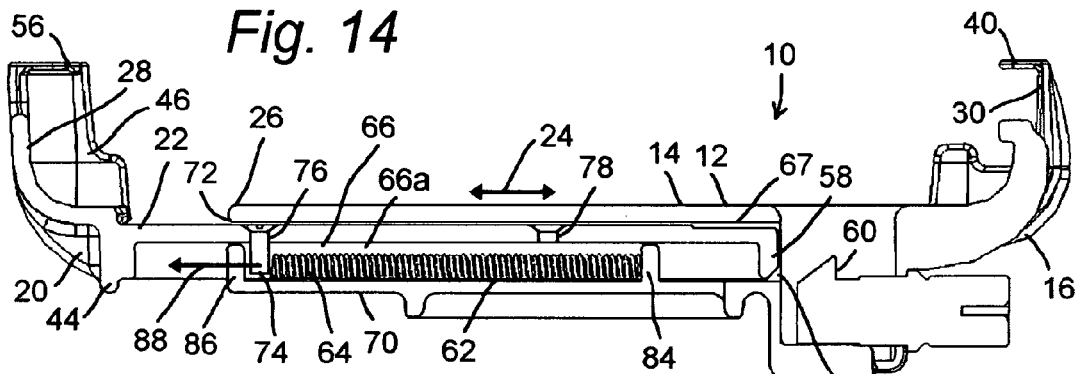

FIG. 14 is a cross-section view that illustrates the device mounting platform apparatus 10 as having the clamp member 20 in the expanded relationship with the frame member 12. The novel device mounting platform apparatus 10 is illustrated here by example and without limitation as having an alternative embodiment of the reconfigurable biasing mechanism 62 having the positions of the actuator portions 74 switched with positions of the internal reaction portions 84 and 86. Accordingly, the internal reaction portions 84 and 86 are provided on the frame member 12 in spaced apart positions along the track channel 68 with the retractive internal reaction portions 86 being positioned adjacent to the second edge 26 of the frame member 12, while the expansive internal reaction portions 84 are spaced away therefrom toward the first edge 18. The containment channels 66 are formed in the floor portion 70 of the frame member 12 between the internal reaction portions 84 and 86. The actuator portions 74 are provided on the sled portion 22 of the clamp member 20 in the spaced apart between clamp expansion positions 76 and clamp retraction positions 78 between the internal reaction portions 84 and 86. The clamp expansion positions 76 are positioned adjacent to the jaw portion 28 of the clamp member 20, while the clamp retraction positions 78 are spaced away therefrom adjacent to the second latching end 58 of the sled portion 22. The actuator portions 74 are movable between the clamp expansion and retraction positions 76 and 78 for forming the expansion and retraction portions 66a and 66b within the containment channels 66 and configuring the reconfigurable biasing mechanism 62 in the different expansion and retraction modes, respectively.

Here, the reconfigurable biasing mechanism 62 is configured in an expansion mode. Accordingly, the actuator portions 74 are positioned in the clamp expansion positions 76 spaced away from the second latching end 58 of the sled portion 22. The biasing members 64 are captured in the expansion portions 66a of the containment channels 66 between the actuator portions 74 and the internal expansive reaction portions 84 adjacent to the jaw portion 28 of the clamp member 20. Accordingly, the biasing members 64 and actuator portions 74 are positioned relative to the containment channels 66 for urging the sled portion 22 of the clamp member 20 to slide along the first direction 24 within the track channel 68 heading out the mouth opening 72. When the catch 60 is released from the second latching end 58 of the sled portion 22, as illustrated here, expansion of the one or more biasing members 64 generates the internal expansive biasing force 88 between the actuator portions 74 and the internal expansive reaction portions 84 that urges the sled portion 22 of the clamp member 20 on a heading along the track channel 68 for spacing the jaw portion 28 outward away from the second edge 26 of the device mounting surface 14. The internal expansive biasing force 88 thus urges the clamp member 20 to obtain or remain in its expanded relationship relative to the frame member 12. The mounting platform apparatus 10 is thus open to receive or retrieve the portable device.

The second retractive internal reaction portions 86 are optionally positioned relative to the actuator portions 74, as illustrated here, to mutually interfere along the first direction 24 to limit expansion of the clamp member 20 relative to the frame member 12. The clamp member 20 is thus restrained from expanding more than needed for inserting the portable electronic device into the mounting platform apparatus 10. Other mechanisms for restraining excess expansion of the clamp member 20 relative to the frame member 12 are also contemplated and may be substituted without departing from scope and intent of the present invention.

Figure 15:
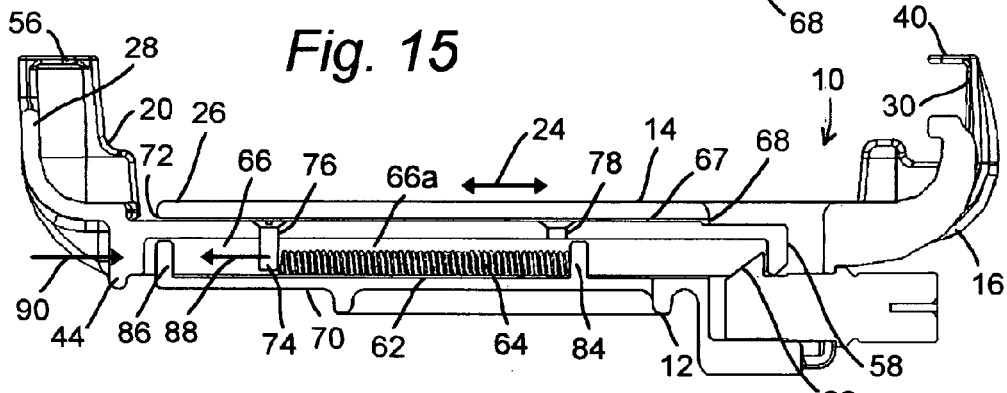

FIG. 15 is a cross-section view that illustrates the alternative reconfigurable biasing mechanism 62 configured in an expansion mode. Here, the opposing external compressive force 90 greater than the internal expansive biasing force 88 must be applied for retracting the clamp member 20 relative to the frame member 12. The device mounting platform apparatus 10 is illustrated here as having the clamp member 20 in the retracted relationship with the frame member 12. The greater opposing external compression force 90 must overcome the internal expansion biasing force 88 to forcefully compress the biasing members 64 within the expansion portions 66a of the containment channels 66 between the actuator portions 74 and the expansive internal reaction portions 84. The sled portion 22 of the clamp member 20 is forced against the internal expansion force 88 of the biasing members 64 to move along the first direction 24 heading inwardly through the mouth opening 72 and slide relative to the floor portion 70 of the frame member 12 within the track channel 68. The sled portion 22 of the clamp member 20 is moved far enough along the track channel 68 for its latching end 58 to approach the first edge 18 of the device mounting surface 14 where it is engaged by the catch 60. The biasing members 64 are compressed in the expansion portions 66a of the containment channels 66 between the actuator portions 74 and the expansive internal reaction portions 84 and restrained against immediate expansion by engagement of the catch 60 with the latching end 58 of the sled portion 22. Accordingly, release of the catch 60 permits the compressed biasing members 64 to forcefully expand against the expansive internal reaction portions 84 within the expansion portions 66a of the channels 66. Expansion of the biasing members 64 forcefully drives the sled portion 22 of the clamp member 20 to slide along the track channel 68 in the floor portion 70 of the frame member 12 until the actuator portions 74 encounter the retractive internal reaction portions 86. The internal expansive biasing force 88 thus urges the clamp member 20 to obtain its expanded relationship relative to the frame member 12, as illustrated in FIG. 14, whereby the jaw portion 28 is spaced away from the second edge 26 of the device mounting surface 14 sufficiently to receive or retrieve the portable device.

Figure 16:
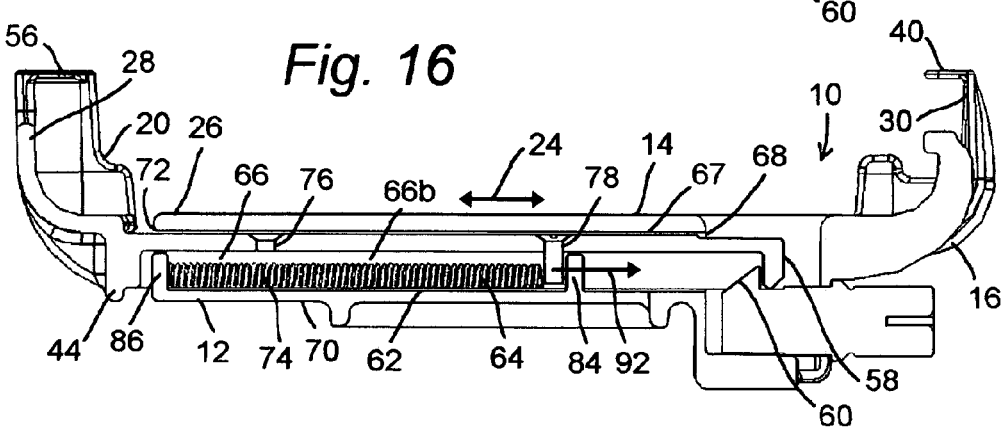

FIG. 16 is a cross-section view that illustrates the device mounting platform apparatus 10 as having the clamp member 20 in the retracted relationship with the frame member 12. The novel device mounting platform apparatus 10 is illustrated here by example and without limitation as having the alternative reconfigurable biasing mechanism 62 reconfigured in a retraction mode. Accordingly, the one or more movable actuator portions 74 are repositioned from the clamp expansion positions 76 (shown in FIG. 14) to the clamp retraction positions 78 in the sled portion 22 of the clamp member 20 adjacent to the second latching end 58. The biasing members 64 are repositioned within the containment channels 66 from the expansion portions 66a between the actuator portions 74 and the expansive internal reaction portions 84 to the retraction portions 66b of the containment channels 66 between the actuator portions 74 and the retractive internal reaction portions 86 adjacent to the second edge 26 of the device mounting surface 14. Accordingly, the biasing members 64 and actuator portions 74 are positioned relative to the containment channels 66 for generating the internal retraction biasing force 92 that urges the sled portion 22 of the clamp member 20 to slide along the first direction 24 within the track channel 68 heading into the mouth opening 72, rather than on a heading out of the mouth opening 72 as caused by the internal biasing force 88 generated in the expansion mode of the alternative reconfigurable biasing mechanism 62. The internal biasing force 92 thus urges the clamp member 20 to retain its retracted relationship relative to the frame member 12.

When the alternative reconfigurable biasing mechanism 62 is configured in the retraction mode, as illustrated here by example and without limitation, engagement of the catch 60 with the second latching end 58 of the sled portion 22 is a security mechanism for ensuring the installed portable electronics device remains securely mounted in the mounting platform apparatus 10. Furthermore, when the catch 60 is a lock as shown, the installed portable electronics device remains secure against unauthorized removal. Thus, disengagement of the catch 60 from the second latching end 58 of the sled portion 22 only permits manual retraction of the clamp member 20 relative to the frame member 12.

Figure 17:
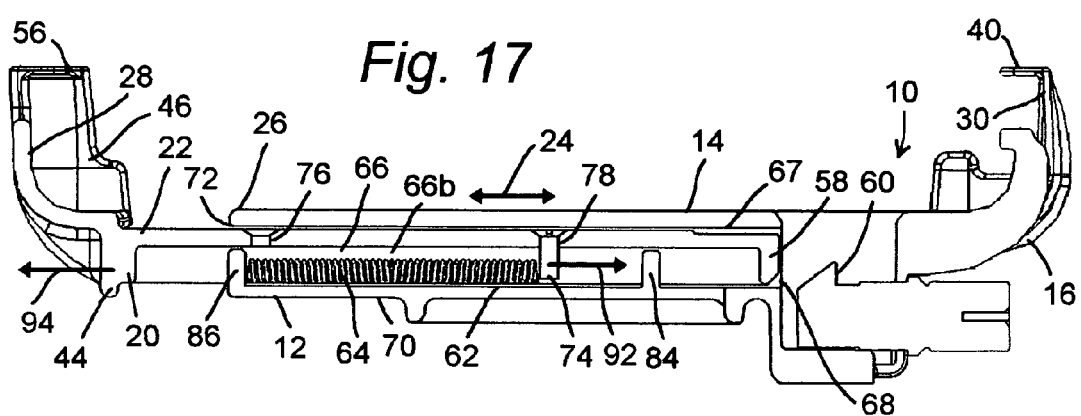

FIG. 17 is a cross-section view that illustrates by example and without limitation the novel device mounting platform apparatus 10 as having the clamp member 20 in the expanded relationship with the frame member 12. The alternative reconfigurable biasing mechanism 62 is configured here in a retraction mode. Accordingly, the one or more movable actuator portions 74 are positioned the clamp retraction positions 78 of the clamp member 20 adjacent to the second latching end 58 of the sled portion 22. The biasing members 64 are positioned within the retraction portions 66b of the containment channels 66 between the actuator portions 74 and the retractive internal reaction portions 86 in the floor portion 70 of the frame member 12 adjacent to the second edge 26 of the device mounting surface 14. The biasing members 64 are thus positioned relative to the containment channels 66 for generating the internal biasing force 92 that urges the sled portion 22 of the clamp member 20 to slide along the first direction 24 within the track channel 68 on a heading into the mouth opening 72. The internal biasing force 92 thus urges the clamp member 20 to obtain its retracted relationship relative to the frame member 12, as illustrated in FIG. 16.

When the catch 60 is released from the second latching end 58 of the sled portion 22, as illustrated here, an opposing external expansive force 94 greater than the internal retractive biasing force 92 must be applied for expanding the clamp member 20 relative to the frame member 12. The greater opposing external expansion force 94 must overcome the internal retractive biasing force 92 to forcefully compress the biasing members 64 within the retraction portions 66b of the containment channels 66 between the actuator portions 74 and the retractive internal reaction portions 86. The sled portion 22 of the clamp member 20 is forced against the internal expansion force 92 of the biasing members 64 to head along the first direction 24 outwardly through the mouth opening 72 and slide relative to the floor portion 70 of the frame member 12 within the track channel 68. The sled portion 22 of the clamp member 20 is moved far enough along the track channel 68 to receive or retrieve the portable device. The biasing members 64 are compressed within the retraction portions 66b of the containment channels 66 between the actuator portions 74 and the retractive internal reaction portions 86. The mounting platform apparatus 10 is thus open to receive or retrieve the portable device. A limiting mechanism is optionally provided for limiting travel of the clamp member 20. Alternatively, mere compression of the biasing members 64 can be relied upon for limiting travel of the clamp member 20.

A trigger mechanism is optionally provided for restraining the compressed biasing members 64 against immediate expansion, and thereby retraction of the clamp member 20. Accordingly, removal of the external expansion force 94 permits the compressed biasing members 64 to forcefully expand between the actuator portions 74 and the retractive internal reaction portions 86 within the retraction portions 66b of the channels 66. Expansion of the biasing members 64 forcefully drives the sled portion 22 of the clamp member 20 to slide inwardly along the track channel 68 in the floor portion 70 of the frame member 12 until the second latching end 58 of the sled portion 22 encounters the catch 60 and is engaged therewith, or the actuator portions 74 encounter the expansive internal reaction portions 84, whichever occurs first.

As discussed herein, the alternative embodiment of the reconfigurable biasing mechanism 62 described in FIGS. 14-17 operates substantially the same as the embodiment described in FIGS. 4-13.

Figure 18:
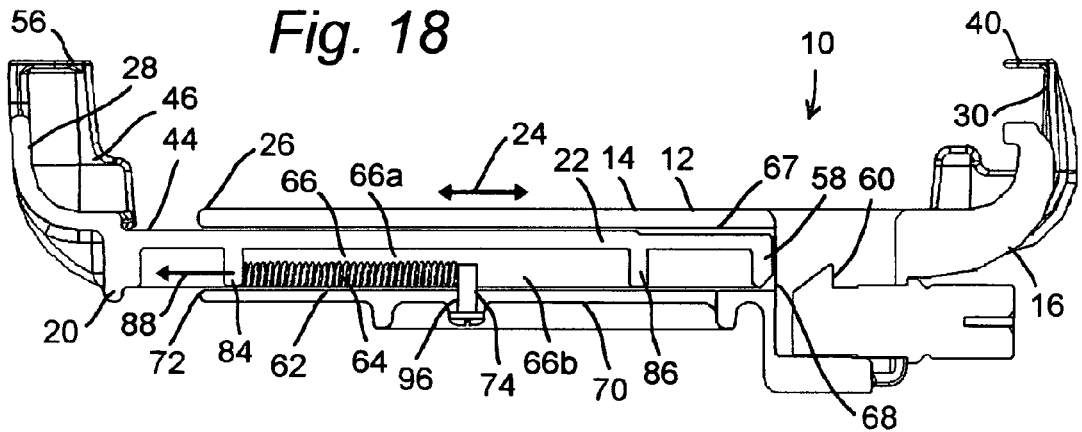

FIG. 18 is a cross-section view that illustrates the device mounting platform apparatus 10 as having the clamp member 20 in the expanded relationship with the frame member 12. The novel device mounting platform apparatus 10 is illustrated here by example and without limitation as having another alternative embodiment of the reconfigurable biasing mechanism 62 having the actuator portions 74 being stationary in single fixed positions 96 between the internal reaction portions 84 and 86. Here, the reversible biasing members 64 are switched between the stationary actuator portions 74 and one of the internal reaction portions 84 and 86 for expansion and retraction, respectively. When the alternative reconfigurable biasing mechanism 62 is configured in the expansion mode, as illustrated here, the biasing members 64 are captured in the expansion portions 66a of the containment channels 66 between the actuator portions 74 and the expansive internal reaction portions 84 adjacent to the jaw portion 28 of the clamp member 20. Accordingly, the biasing members 64 and actuator portions 74 are positioned relative to the containment channels 66 for urging the sled portion 22 of the clamp member 20 to slide along the first direction 24 within the track channel 68 heading out the mouth opening 72. When the catch 60 is released from the second latching end 58 of the sled portion 22, as illustrated here, expansion of the one or more biasing members 64 generates the internal expansive biasing force 88 between the stationary actuator portions 74 and the internal expansive reaction portions 84 that urges the sled portion 22 of the clamp member 20 on a heading along the track channel 68 for spacing the jaw portion 28 outward away from the second edge 26 of the device mounting surface 14. The distance between the spaced apart internal reaction portions 84 and 86 is a function of the desired size and strength of the spring biasing members 64, as well as the desired spacing between the jaw portion 28 from the second edge 26 of the device mounting surface 14 in the expanded relationship of the clamp member 20 and frame member 12. The internal expansive biasing force 88 thus urges the clamp member 20 to obtain or remain in its expanded relationship relative to the frame member 12. The mounting platform apparatus 10 is thus open to receive or retrieve the portable device.

An expansion restraining mechanisms is optionally provided for restraining excess expansion of the clamp member 20 relative to the frame member 12. Such expansion restraining mechanisms are contemplated and may be substituted without departing from scope and intent of the present invention.

Figure 19:
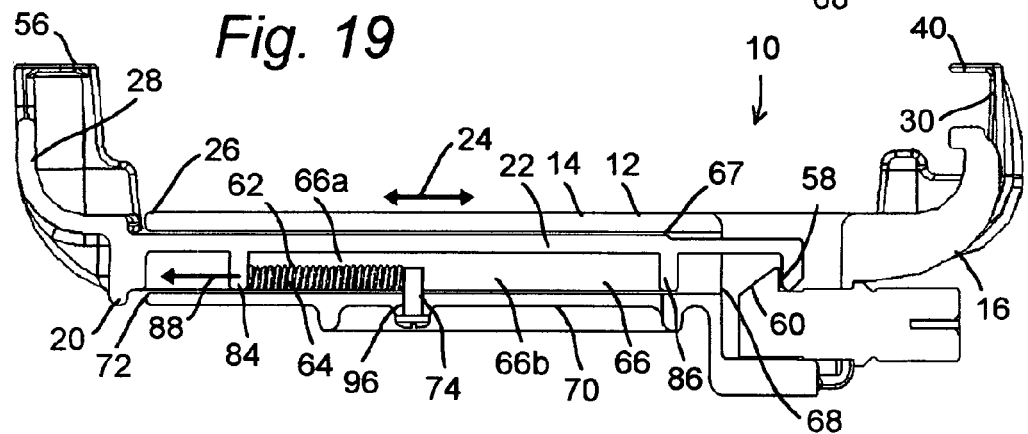

FIG. 19 is a cross-section view that illustrates the alternative reconfigurable biasing mechanism 62 configured in an expansion mode. The device mounting platform apparatus 10 is illustrated here as having the clamp member 20 in the retracted relationship with the frame member 12. Here, the opposing external compressive force 90 greater than the internal expansive biasing force 88 must be applied for retracting the clamp member 20 relative to the frame member 12. The greater opposing external compression force 90 must overcome the internal expansion biasing force 88 to forcefully compress the biasing members 64 within the expansion portions 66a of the containment channels 66 between the stationary actuator portions 74 and the expansive internal reaction portions 84. The sled portion 22 of the clamp member 20 is forced against the internal expansion force 88 of the biasing members 64 to move along the first direction 24 heading inwardly through the mouth opening 72 and slide relative to the floor portion 70 of the frame member 12 within the track channel 68. The sled portion 22 of the clamp member 20 is moved far enough along the track channel 68 for its latching end 58 to approach the first edge 18 of the device mounting surface 14 where it is engaged by the catch 60. The biasing members 64 are compressed in the expansion portions 66a of the containment channels 66 between the stationary actuator portions 74 and the expansive internal reaction portions 84 and restrained against immediate expansion by engagement of the catch 60 with the latching end 58 of the sled portion 22. Accordingly, release of the catch 60 permits the compressed biasing members 64 to forcefully expand against the expansive internal reaction portions 84 of the expansion portions 66a of the channels 66. Expansion of the biasing members 64 forcefully drives the sled portion 22 of the clamp member 20 to slide along the track channel 68 in the floor portion 70 of the frame member 12 until the retractive internal reaction portions 86 encounter the stationary actuator portions 74 or another expansion restraining mechanisms is actuated for restraining excess expansion of the clamp member 20 relative to the frame member 12. The internal expansive biasing force 88 thus urges the clamp member 20 to obtain its expanded relationship relative to the frame member 12, as illustrated in FIG. 18, whereby the jaw portion 28 is spaced away from the second edge 26 of the device mounting surface 14 sufficiently to receive or retrieve the portable device.

Figure 20:
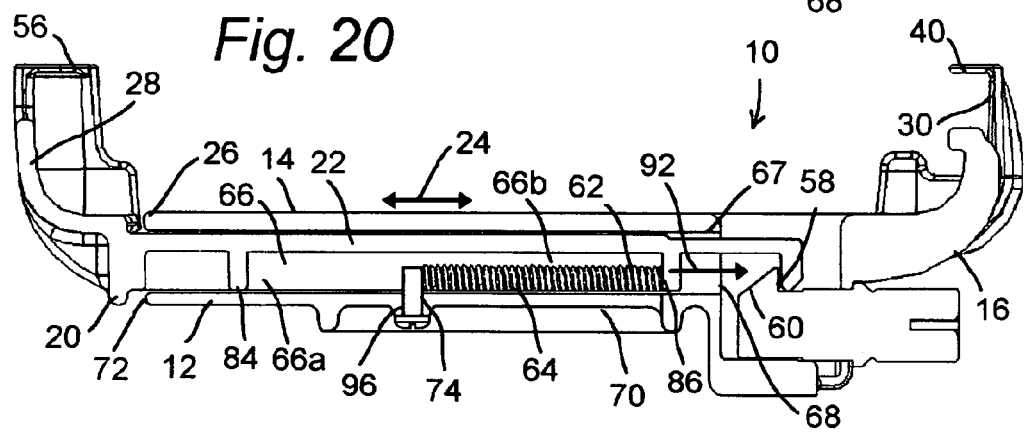

FIG. 20 is a cross-section view that illustrates the device mounting platform apparatus 10 as having the clamp member 20 in the retracted relationship with the frame member 12. The novel device mounting platform apparatus 10 is illustrated here by example and without limitation as having the alternative reconfigurable biasing mechanism 62 reconfigured in a retraction mode. Accordingly, the one or more repositionable biasing members 64 are repositioned within the containment channels 66 from the expansion portions 66a between the stationary actuator portions 74 and the expansive internal reaction portions 84 to the retraction portions 66b between the stationary actuator portions 74 and the retractive internal reaction portions 86 adjacent to the second latching end 58 of the sled portion 22. Accordingly, the biasing members 64 are positioned relative to the containment channels 66 and stationary actuator portions 74 for generating the internal retraction biasing force 92 that urges the sled portion 22 of the clamp member 20 to slide along the first direction 24 within the track channel 68 heading into the mouth opening 72, rather than on a heading out of the mouth opening 72 as caused by the internal biasing force 88 generated in the expansion mode of the reconfigurable biasing mechanism 62. The internal biasing force 92 thus urges the clamp member 20 to retain its retracted relationship relative to the frame member 12.

When the alternative reconfigurable biasing mechanism 62 is configured in the retraction mode, as illustrated here by example and without limitation, engagement of the catch 60 with the second latching end 58 of the sled portion 22 is a security mechanism for ensuring the installed portable electronics device remains securely mounted in the mounting platform apparatus 10. Furthermore, when the catch 60 is a lock as shown, the installed portable electronics device remains secure against unauthorized removal. Thus, disengagement of the catch 60 from the second latching end 58 of the sled portion 22 only permits manual retraction of the clamp member 20 relative to the frame member 12.

Figure 21:
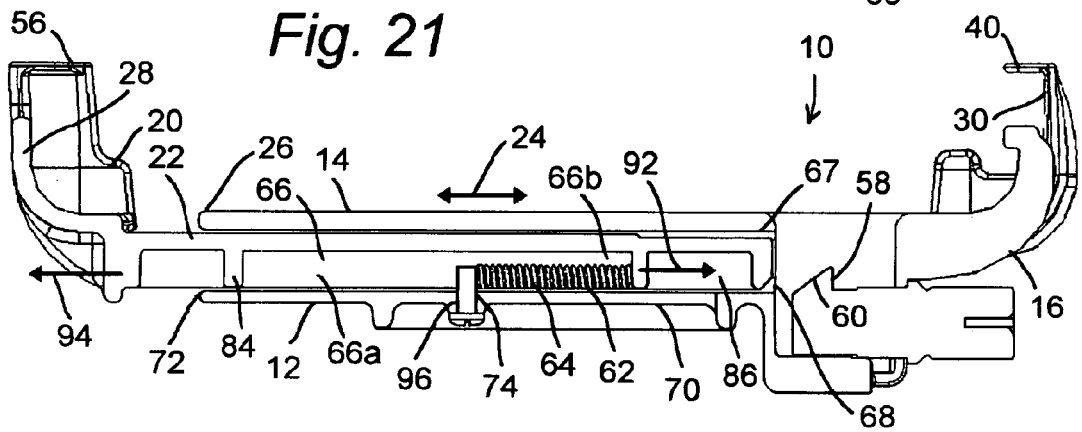

FIG. 21 is a cross-section view that illustrates by example and without limitation the novel device mounting platform apparatus 10 as having the clamp member 20 in the expanded relationship with the frame member 12. The alternative reconfigurable biasing mechanism 62 is configured in a retraction mode. Accordingly, the one or more biasing members 64 are positioned within the retraction portions 66b of the containment channels 66 between the stationary actuator portions 74 and the retractive internal reaction portions 86 adjacent to the second latching end 58 of the sled portion 22. The biasing members 64 are thus positioned relative to the containment channels 66 for generating the internal biasing force 92 that urges the sled portion 22 of the clamp member 20 to slide along the first direction 24 within the track channel 68 into the mouth opening 72. The internal biasing force 92 thus urges the clamp member 20 to obtain or remain in its retracted relationship relative to the frame member 12, as illustrated in FIG. 20.

When the catch 60 is released from the second latching end 58 of the sled portion 22, as illustrated here, the opposing external expansive force 94 greater than the internal retractive biasing force 92 must be applied for expanding the clamp member 20 relative to the frame member 12. The greater opposing external expansion force 94 must overcome the internal retractive biasing force 92 to forcefully compress the biasing members 64 within the retraction portions 66b of the containment channels 66 between the stationary actuator portions 74 and the retractive internal reaction portions 86. The sled portion 22 of the clamp member 20 is forced against the internal expansion force 92 of the biasing members 64 to head along the first direction 24 outwardly through the mouth opening 72 and slide relative to the floor portion 70 of the frame member 12 within the track channel 68. The sled portion 22 of the clamp member 20 is moved far enough along the track channel 68 to receive or retrieve the portable device. The biasing members 64 are compressed in the retraction portions 66b of the containment channels 66 between the stationary actuator portions 74 and the retractive internal reaction portions 86. A limiting mechanism is optionally provided for limiting travel of the clamp member 20. Alternatively, mere compression of the biasing members 64 can be relied upon for limiting travel of the clamp member 20. The mounting platform apparatus 10 is thus open to receive or retrieve the portable device.

A trigger mechanism is optionally provided for restraining the compressed biasing members 64 against immediate expansion. Accordingly, removal of the external expansion force 94 permits the compressed biasing members 64 to forcefully expand against the retractive internal reaction portions 86 within the retraction portions 66b of the channels 66. Expansion of the biasing members 64 forcefully drives the sled portion 22 of the clamp member 20 to slide inwardly along the track channel 68 in the floor portion 70 of the frame member 12 until the second latching end 58 of the sled portion 22 encounters the catch 60 and is engaged therewith.

As discussed herein, the alternative embodiment of the reconfigurable biasing mechanism 62 described in FIGS. 18-21 operates substantially the same as the embodiment described in FIGS. 4-13. However, the fixed positions 96 of the stationary actuator portions 74 of the reconfigurable biasing mechanism 62 split the biasing member containment channels 66 into shorter expansion and retraction channel portions 66a and 66b than is possible using the repositionable actuator portions 74 switched between the clamp expansion positions 76 and clamp retraction positions 78 because alternating between the clamp expansion and retraction positions 76 and 78 places the repositionable actuator portions 74 alternately further from the respective internal reaction portions 84 and 86. The longer expansion and retraction channel portions 66a and 66b permits use longer spring biasing members 64, which permits greater control over spring rate.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A device mounting platform apparatus, comprising:
a frame member formed with a device mounting surface between spaced apart first and second edges, the frame member being structured for being mounted in a vehicle with the device mounting surface having a generally upwardly orientation;
a clamp member slidably interconnected to the frame member for motion relative to the second edge of the frame member along a first direction oriented substantially crosswise of the spaced apart first and second edges thereof; and
a reconfigurable biasing mechanism coupled between the frame and clamp members, the biasing mechanism being reconfigurable between a first configuration for urging a jaw portion of the clamp member away from the second edge of the frame member along a first heading substantially aligned with the first direction, and a second configuration for urging the jaw portion of the clamp member toward the second edge of the frame member along a second heading substantially aligned with the first direction.

2. The apparatus of claim 1 wherein the reconfigurable biasing mechanism further comprises a resiliently compressible biasing member coupled between the frame and clamp members, the biasing member being repositionable between different ones of first and second reaction portions fixed relative to a first one of the frame and clamp members in spaced apart positions substantially along the first direction and an actuator portion positioned relative to a second one of the frame and clamp members between the first and second fixed reaction portions, the biasing member being compressible between the actuator portion and the first fixed reaction portion in the first configuration, and compressible between the actuator portion and the second fixed reaction portion in the second configuration.

3. The apparatus of claim 2 wherein the actuator portion of the reconfigurable biasing mechanism further comprises a repositionable actuator portion, the actuator portion being repositionable in the first and second configurations between respective different first and second actuator positions spaced apart substantially along the first direction between the first and second fixed reaction portions.

4. The apparatus of claim 3 wherein the repositionable actuator portion of the reconfigurable biasing mechanism is further repositionable between first and second positions relative to the clamp member; and
the first and second reaction portions are further fixed relative to the frame member.

5. The apparatus of claim 3 wherein the repositionable actuator portion of the reconfigurable biasing mechanism is further repositionable between first and second positions relative to the frame member; and
the first and second reaction portions are further fixed relative to the clamp member.

6. The apparatus of claim 3 wherein the clamp member further comprises a sled portion extended from the jaw portion thereof, the sled portion being slidably interconnected to the frame member for motion along the first direction for moving the jaw portion between first and second positions relative to the second edge of the frame member.

7. The apparatus of claim 6 wherein the frame member further comprises a track formed substantially along the first direction between first and second edges of the mounting surface, the sled portion of the clamp member being structured to slide relative to the track.

8. The apparatus of claim 7 wherein the sled portion of the clamp member further comprises the first and second fixed reaction portions and an elongated containment channel formed therebetween; and
the biasing member further being resiliently compressible within the containment channel.

9. A device mounting platform apparatus, comprising:
a frame member formed with a device mounting surface between opposing first and second edges spaced apart along a first direction, the frame member being structured for being mounted in a vehicle with the device mounting surface having a generally upwardly orientation;
a jaw portion structured adjacent to the first edge of the frame member;
a guide mechanism structured substantially along the first direction adjacent to the device mounting surface of the frame member;
a clamp member having an elongated sled portion with a jaw portion extended substantially crosswise thereof adjacent to a first end thereof, the sled portion being slidably interconnected to the guide mechanism of the frame member for motion substantially along the first direction thereof; and
a reconfigurable biasing mechanism coupled between the frame and clamp members for urging the sled portion of the clamp member along the guide mechanism relative to the first direction, the biasing mechanism being reversible between a first configuration for resiliently urging the jaw portion of the clamp member away from the second edge of the frame member, and a second configuration for resiliently urging the jaw portion toward the second edge of the frame member.

10. The apparatus of claim 9 wherein the sled portion of the clamp member further comprises a first reaction portion adjacent to the first end thereof, and a second reaction portion spaced away from the first reaction portion along the sled portion; and the reconfigurable biasing mechanism further comprises:

an actuator movable between first and second positions relative to the guide mechanism, the first and second positions being spaced apart along the first direction between the first and second reaction portions, and a compression spring member, the compression spring member being resiliently compressible between the movable actuator and the first reaction portion of the clamp member when the movable actuator is in the first position, and compressible between the movable actuator and the second reaction portion of the clamp member when the movable actuator is in the second position.

11. The apparatus of claim 10 wherein the guide mechanism further comprises a guide channel formed along the first direction of the frame member opposite from the device mounting surface, and the sled portion of the clamp member being structured to slide therein along the first direction.

12. The apparatus of claim 10 wherein the sled portion of the clamp member further comprises an elongated containment channel formed between the first and second reaction portions thereof; and the compression spring member further being resiliently compressible within the containment channel of the sled portion.

13. The apparatus of claim 12 wherein the sled portion of the clamp member is further interlockable with the jaw portion of the clamp member being retracted adjacent to the second edge of the frame member.

14. A device mounting platform apparatus, comprising:

a frame member formed with a device mounting surface between opposing first and second edges spaced apart along a first direction, the frame member further comprising means for being mounted in a vehicle with the device mounting surface having a generally upwardly orientation;

a clamp member movable relative to the frame member;

means for guiding the clamp member relative to the frame member along the first direction thereof; and a means for biasing the clamp member relative to the frame member, the biasing means being reconfigurable between a first configuration for urging a jaw portion of the clamp member along a first heading substantially aligned with the first direction away from the second edge of the frame member, and a second configuration for urging the jaw portion of the clamp member along a second heading opposite from the first heading and substantially aligned with the first direction toward the second edge of the frame member.

15. The apparatus of claim 14 wherein the biasing means further comprises a resiliently compressible biasing member; and the reconfigurable biasing means further comprises:

first and second reaction means operable between the frame and clamp members, the resiliently compressible biasing member being positioned between first and second reaction means, means for actuating the biasing member, the actuating means actuating the biasing member relative to the first reaction means in the first configuration, and the actuating means actuating the biasing member relative to the second reaction means in the second configuration.

16. The apparatus of claim 15, further comprising means for repositioning the actuating means between a first position between the first and second reaction means in the first configuration, and a different second position between the first and second reaction means in the second configuration.

17. The apparatus of claim 16 wherein the first reaction means is positioned adjacent to the second edge of the frame member and the first position of the actuating means is spaced away therefrom in the first configuration, and the second reaction means is positioned spaced away from the second edge of the frame member and the second position of the actuating means is spaced adjacent thereto in the second configuration.

18. The apparatus of claim 17 wherein the clamp member further comprises the first and second reaction means relative to the jaw portion thereof, the first reaction means being positioned adjacent thereto, and the second reaction means being positioned spaced away therefrom; and the frame member further comprises the first and second positions of the actuating means relative to the second edge thereof, the first position of the actuating means being spaced away therefrom, and the second position of the actuating means being spaced adjacent thereto.

19. The apparatus of claim 17 wherein the frame member further comprises the first and second reaction means relative to the second edge thereof, the first reaction means being positioned adjacent thereto, and the second reaction means being positioned spaced away therefrom; and the clamp member further comprises the first and second positions of the actuating means relative to the jaw portion thereof, the first position of the actuating means being spaced away therefrom, and the second position of the actuating means being spaced adjacent thereto.

20. The apparatus of claim 17, further comprising means for interlocking the clamp member relative to the frame member with the jaw portion adjacent to the second edge thereof.

\* \* \* \* \*